April 19, 1966   B. F. FLODEN   3,246,817
DEVICE FOR AUTOMATICALLY STOPPING A FILM
Filed June 17, 1964   2 Sheets-Sheet 1

INVENTOR.
BJORN F. FLODEN
BY
Attorney

INVENTOR.
BJORN F. FLODEN
BY
Morris Rabin
Attorney

United States Patent Office 3,246,817
Patented Apr. 19, 1966

3,246,817
DEVICE FOR AUTOMATICALLY
STOPPING A FILM
Bjorn F. Floden, Palmyra, N.J., assignor to Radio Corporation of America, a corporation of Delaware
Filed June 17, 1964, Ser. No. 375,860
6 Claims. (Cl. 226—33)

This invention relates to a device for stopping a moving film in response to a cue patch carried thereby and is particularly adapted to stop a motion picture film in such a position that a predetermined frame of the film stops in the projection aperture of the projector.

In projecting moving pictures, it may be desired to project a still picture comprising a certain frame of the film. To do this, the film must be so stopped that the certain frame is in the projection aperture. No undue strain should be put on the parts of the projector in stopping the film moving mechanism of the projector.

It is an object of this invention to provide an improved device for so stopping a film that a particular frame thereof is in the projection aperture of the projection apparatus.

It is a further object of this invention to provide a means that operates to stop the advance of film without placing undue strain on the projector mechanism.

In accordance with this invention, a conductive cue patch, applied to the film, completes a circuit when the cue patch is drawn between a feed sprocket and a cooperating film shoe. The circuit so made causes deenergization of the motor comprising the main power source for the projector, and braking of the main motor to stop it after a coasting period. Means may also be provided to release the brake and to reset the cue stop mechanism so that, after the film moving means is restarted, the film may again be stopped in response to a subsequent cue patch thereon.

Figure 1:
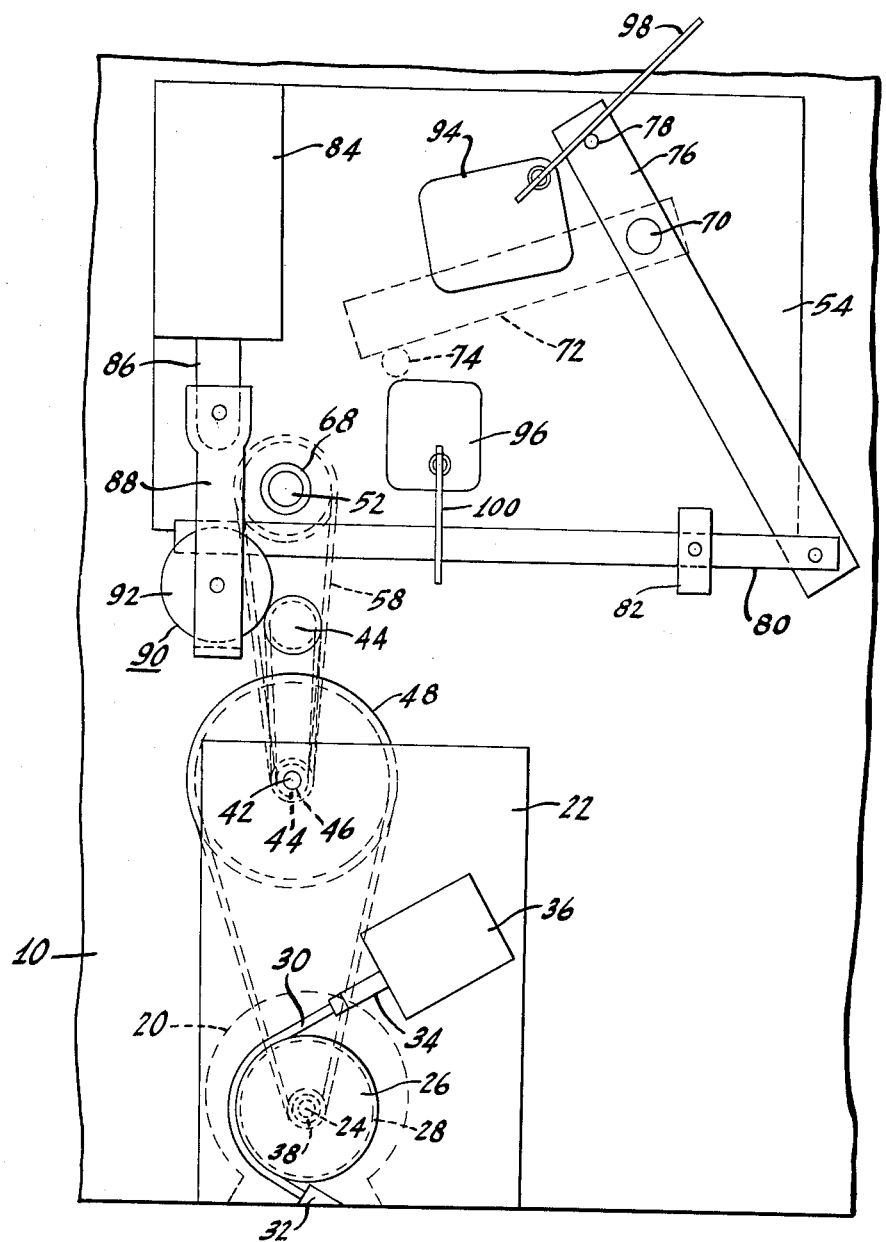
Figure 2:
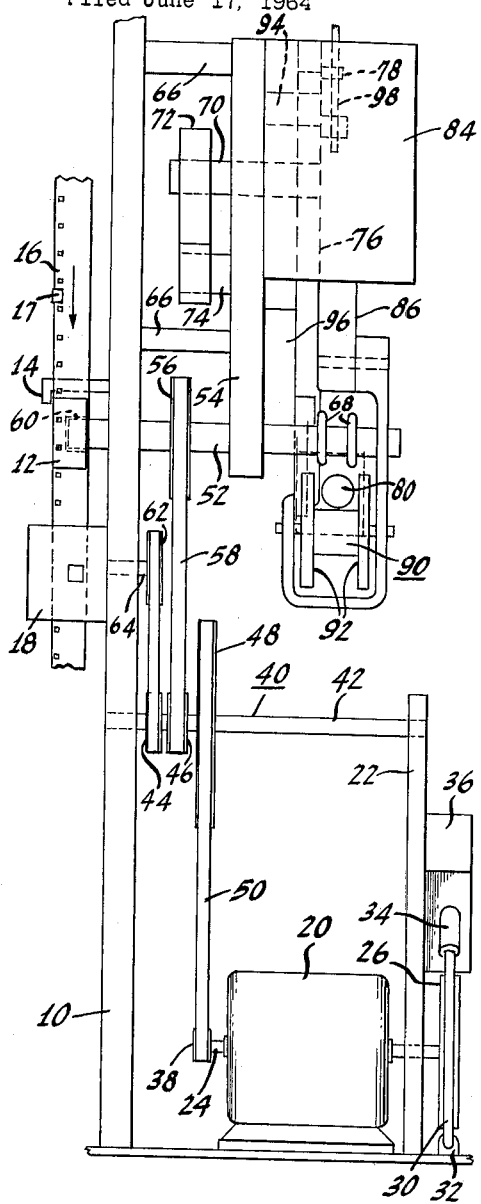
Figure 3:
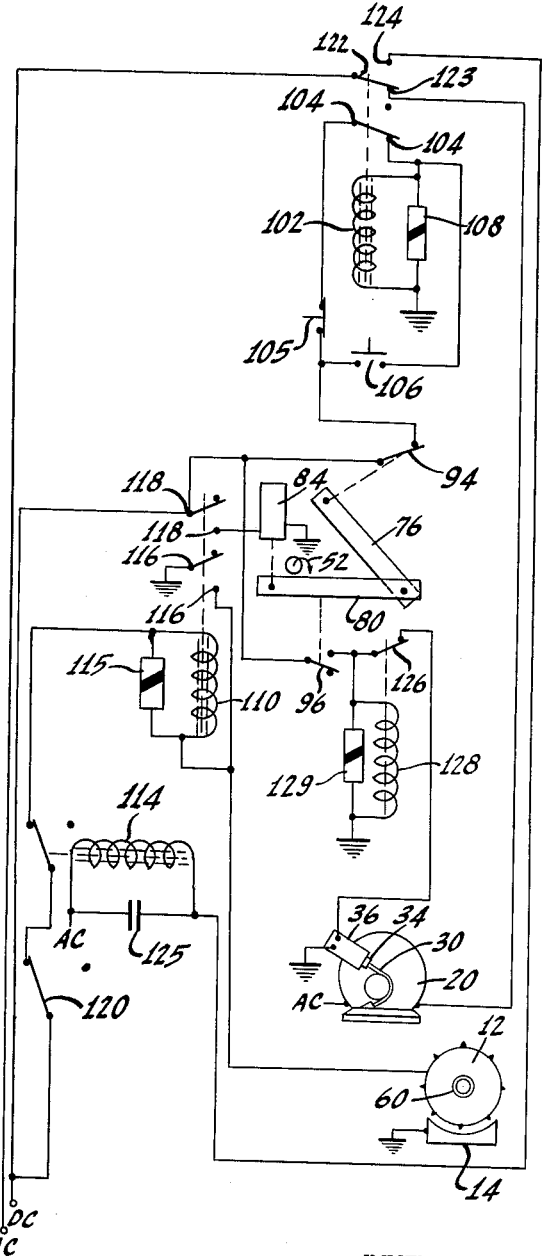

The novel features of this invention, both as to its organization and method of operation, as well as additional objects and advantages thereof, will be understood more readily from the following description, when read in conjunction with the accompanying drawing, in which:

FIGURE 1 is a fragmentary, rear elevational view of a moving picture projector provided with one form of film mechanism in accordance with the present invention, FIGURE 2 is an end elevational view of the mechanism of FIGURE 1, certain parts being omitted for clarity of the showing, and FIGURE 3 is a diagrammatic showing of a circuit suitable for the apparatus of FIGURES 1 and 2.

Referring more particularly to FIGURES 1 and 2, there is shown a moving picture projector having a main support plate 10 on the front of which plate, the left, as viewed in FIGURE 2 is mounted a feed sprocket 12 and a cooperating shoe 14 for advancing a moving picture film 16. Upon rotation of the feed sprocket 12, the film 16 is fed downward to a film gate, shown diagrammatically by the rectangle 18. A conductive cue patch 17 may be applied to the film between two sprocket holes therein for a purpose to be explained. At the back of the support plate 10 (the right side thereof as viewed in FIGURE 2), a motor 20 is provided for feeding the film 16 to the gate 18, as by rotating the feed sprocket 12, and for driving the intermittent mechanism (not shown) at the gate 18.

The motor 20 has a shaft 24 which may extend to the left, as viewed in FIGURE 2. A timing pulley 38 is mounted on the left end of the motor shaft 24. A speed reduction device 40, which includes a shaft 42 rotatably mounted in the main support plate 10 and in an auxiliary support 22, is also provided. This speed reduction device 40 includes three timing pulleys 44, 46 and 48 which are fixed to the shaft 42 for rotation therewith. A timing belt 50 couples the pulley 38 on the motor shaft 24 with the largest one (48) of the three timing pulleys on the shaft 42. Another one (46) of the pulleys on the shaft 42 drives a further shaft 52 that extends rotatably through the main support plate 10 and through a second auxiliary support plate 54 by means of a timing pulley 56 mounted on the shaft 52 and a timing belt 58 coupling the two pulleys 46 and 56. The film feed sprocket 12 is fixedly mounted on the last mentioned shaft 52 but is electrically insulated therefrom, as by insulating 60, for a purpose to be disclosed. The third pulley (44) on the speed reduction shaft 42 is coupled to a pulley 62 on a fourth shaft 64 that extends through the main frame 10 for operating the intermittent device of the gate 18. Since this drive is no part of the present invention, it is not shown in detail.

Means are provided for so stopping the motor 20 that a predetermined frame of the film 16 relative to the cue patch is stopped in the projection aperture of the gate 18. This means includes the auxiliary support plate 22 which is so mounted to the right of the motor 20 (as viewed in FIGURE 2) that the shaft 24 of the motor 20 extends therethrough. A brake disk 26 having a grooved periphery 28 (see FIGURE 1) is fixed to the shaft 24 for rotation therewith. A rubber brake band 30, one end of which is fixed to an anchor 32, extends along the periphery of the brake disk 26 for about half the circumference thereof. The other end of the rubber band 30 is fixed to the movable element or armature 34 of a solenoid 36 which is mounted on the auxiliary support 22. Upon energization of the solenoid 36, the rubber brake band 30 is brought into contact with the grooved periphery 28 of the disk 26, and the frictional engagement of the disk 26 and the band 30 causes braking of the motor 10. The direction of rotation of the motor 10 being clockwise, as viewed in FIGURE 1, the braking force is taken up by the anchor 32. Due to the natural resilience of the band 30, it stretches during braking thereby easing the shock of stopping rotation of the motor shaft and the parts coupled thereto. Upon deenergization of the solenoid 36, the band 30 takes a curved form closely adjacent to, but not in contact with the disk 26, so that no frictional force is normally applied by the brake to the motor 20.

The film stop device includes mechanism which is mounted on the second auxiliary support plate 54, and which is driven by the shaft 52 on which the sprocket 12 is mounted. The support plate 54 is mounted on the main support plate 10 by means of spacers 66. The shaft 52 extends through the plate 54 near the lower left corner thereof, as viewed in FIGURE 1. A pair of spaced O-rings 68 are positioned on this shaft 52 near the free end thereof for a purpose to be disclosed.

A rotatable stub shaft 70 extends through the support plate 54 near the upper right corner thereof. A weight 72 comprising a flat bar is fixed to the shaft 70 between the main support plate 10 and the auxilliary support plate 54. This weight 72 rests on a stop 74 which extends from the auxiliary support plate 10. A lever 76 is fixed to the shaft 70 at the right of the support plate 54, as viewed in FIGURE 2. A portion of this lever 76 extends above the shaft 70 (see FIGURE 1), a switch operating pin 78 extending from this lever 76 above the shaft 70 and away from the support plates 54. One end (the right as viewed in FIGURE 1) of a link which may preferably be a round rod 80 (see FIGURE 2) is pivoted on the lower end of the lever 76. This round rod 80 extends to the left (FIGURE 1) in a substantially horizontal direction. A switch operating collar 82 is adjustably positioned along the rod 80.

A solenoid 84 is mounted on the upper left corner of the support plate 54. The armature 86 of the solenoid 84 extends downwardly and is fixed to a yoke 88 which rotatably supports a roller 90 having guide flanges 92 at the ends thereof. The solenoid armature 86 is supported in the position shown in FIGURE 2 by a pin (not shown) extending from plate 54. The free end of the rod 80 is normally supported by the roller 90 between the guide flanges 92 as can be seen clearly in FIGURE 2.

Two microswitches 94 and 96 are mounted on the auxiliary support 54. The switch 94, which is of the normally open type, is so mounted that its operating lever 98 is engaged by the top of the pin 78, whereby this switch 94 is held closed in the position of the lever 76 shown in FIGURE 1. This is the position occupied by the lever 76 while the film 16 is advancing. The switch 96, which is also of the normally open type, is so mounted that its operating lever 100 extends into the path of the collar 82 whereby the switch 96 may be closed thereby.

Upon energization of the solenoid 84, the rod 80 is lifted until it contacts the O-rings 68 on the shaft 52. The rotation of the shaft 52 clockwise (as viewed in FIGURE 1) causes the rod 80 to move substantially axially to the left, rotating the lever 76 and the shaft 70 clockwise and lifting the weight 72. Continued rotation of the lever 76 moves the pin 78 in an arch toward the right and therefore downwardly. When lever 76 has moved approximately 50% of its total travel, the operating lever 98 of switch 94 has rotated clockwise far enough to permit switch 94 to open. When switch 94 opens, power to the main motor 20 is cut off, and a period of coasting begins as will be explained. Continued motion of the rod 80 to the left (FIGURE 1) causes the collar 82 to eventually engage and rotate the operating lever 100 of the other microswitch 96, thereby causing closing of this normally open microswitch 96. Upon deenergization of the solenoid 84, its armature 86 drops by gravity to thereby lower the yoke 88 and thus withdraw the rod 80 from engagement with the O-rings 68 on the shaft 52. The closing of the microswitch 96 is synchronized with the arrival of the cue marked frame of the film 16 in the projection gate 18. When the switch 96 closes, the brake solenoid 36 is energized and the machine is stopped. Opening of the switch 94 and closing of the switch 96 also initiates the control circuitry to reset itself and to make the mechanism ready for the next cue stop operation, as will be explained. The yoke 88 then holds the rod 80 in a position out of contact with the O-rings 68 on the shaft 52. The weight 72 is then free to rotate counterclockwise to the position shown in FIGURE 1, at which the weight 72 is against the stop 74, the lever 76 is at its extreme counterclockwise position, and the rod 80 is at its extreme right hand position.

A suitable wiring diagram for the film stop mechanism is shown in FIGURE 3. The coil of a motor start relay 102 is connected to a direct current (D.C.) source through the contacts of the normally open microswitch 94 (this switch being held closed during the run condition of the projector by the pin 78 on the lever 76 as noted above) and through hold contacts 104 of this relay 102 in series. The hold contacts 104 are connected to each other through the normally open "start" switch 106. A normally closed "stop" switch 105 may be inserted between the power supply and a contact 104. A Varistor 108, whose resistance is low for high voltage applied thereacross and is high for low voltage applied thereacross, may by connected across the winding of the start relay 102 to protect the accompanying audio system from high transient voltages. The return connection of this relay 102 is through ground.

One terminal of the winding of a cue relay 110 is connected to the D.C. source through the contacts of a cue defeat switch 120, and through the contacts of a slow to operate alternating current (A.C.) operated relay 114 in series, the other terminal of the winding of the cue relay 110 being connected to the sprocket 12 which, as noted above, is insulated from its shaft and, therefore, from the machine ground. The cooperating shoe 14 is connected to ground. A protective Varistor 115 is connected across the winding of the cue relay 110. The relay 110 has a pair of hold contacts 116, one of which is connected to the other terminal of the winding of the relay 110, and the other of which is connected to ground. The cue relay 110 has an additional pair of contacts 118 the purpose of which is described below.

Alternating current is supplied to the main motor 20 through further contacts 122 and 123 of the start relay 102. Another contact 124 of the start relay 102 is connected to one terminal of the slow to operate A.C. operated, microswitch 96 in series with the contacts of a being connected to the other terminal of the A.C. supply. A capacitor 125 may be connected across the coil of relay 114.

Direct current is supplied to the lift solenoid 84 through the additional pair of contacts 118 of the cue relay 110, the circuit of the lift solenoid 84 being completed through ground.

Direct current is also supplied to the brake solenoid 36 through the contacts of the normally open, rod operated, microswitch 96 in series with the contacts of a normally closed switch 126 of a slow to operate relay 128, the circuit of the brake solenoid 36 being completed through ground. One terminal of the winding of the slow to operate relay 128 is connected to the D.C. source through the contacts of the rod operated microswitch 96, the other terminal of this winding being connected to ground. A protective varistor 129 is connected across the terminals of the slow to operate relay 128.

In the operation of the above described apparatus, when the motor 20 is running and the film 16 is advanced, the conductive cue patch 17 on the film 16 eventually arrives between the sprocket 12 and the cooperating shoe 14 to thereby apply ground to the winding of the cue relay 110. Assuming that the cue defeat switch 120 is closed, the contacts of the cue relay 110 are closed by application of ground to the cue relay winding, thus setting up a hold circuit including the contacts 116 for the cue relay 110, and closing the contacts 118, thereby energizing the rod lift, solenoid 84. The rod 80 is thereupon brought into engagement with the rotating shaft 52 and is moved to the left (as viewed in FIGURES 1 and 3), whereby the lever 76 is rotated clockwise, and the pin 78 is moved to the right to lower the pin 78, thereby to permit the switch 94 to open. This breaks the D.C. supply circuit for the start relay 102, whereby its contacts are released, breaking its hold circuit through the contacts 104 and also causing separation of the contacts 122 and 123, thereby deenergizing the motor 20. Deenergization of the start relay 102 also causes its contact 122 to make connection with contact 124 whereby A.C. is applied to the slow to operate A.C. relay 114. The motor 20, although deenergized, continues to coast. The slow to operate relay 114 is constructed not to move its armature until the stop cycle is completed, as described below. As the rod 80 continues to move to the left, the collar 82 on the rod 80 engages the operating lever 100 of the microswitch 96 and actuates it to close the contacts of that switch. Thus, D.C. is applied to the brake solenoid 36 through the normally closed switch 126 of the slow to operate D.C. relay 128. Concurrently, D.C. is applied to the winding of the slow to operate relay 128. Braking action is now applied to the motor shaft 24, stopping the motor 20 at that position whereat the desired frame is in the projection aperture of the gate 18 as predetermined by (a) the position of the cue patch 17 on the film and by (b) the setting of the collar 82 along the rod 80. Since the motor 20 has coasted for an interval of time before the brake is applied thereto, less energy needs to be absorbed by the resilient brake band 30 to stop the motor 20 than would be required if the brake were applied immediately upon deenergization of the motor 20 thereby lessening the load on the brake and further lessening the shock to the moving parts of the projector.

Since the collar 82 is adjustable along the rod 80, the exact position of stopping of the film may be adjusted easily by the simple operation of adjusting the position of the collar 82 along the rod 80. The slow to operate relay 128 breaks the circuit to the brake solenoid 36, thus deenergizing the brake. When the braking cycle is completed, the slow to operate relay 114 moves its armature and breaks the supply circuit for the winding of the cue relay 110. When the cue relay 110 releases, its hold circuit is broken and the rod lift solenoid 84 is deenergized, whereby the rod 80 no longer remains in engagement with the O-rings 68 on the shaft 52. The movable mechanism, consisting of the rod 80, the arm 76, the shaft 70, and weight bar 72, then returns to its start position by the force of gravity. When bar 72 resets against stop 74, the cue stop device is ready for the next cue stop operation. If it be desired to defeat the cue patch 17, or to run a film having cue patches thereon without automatic stops, the cue defeat switch 120 is moved to its open position, thereby preventing the energizing of the cue relay 110.

Although only a single cue responsive film stopping device has been described, it will undoubtedly be apparent to those skilled in the art that variations are possible within the spirit of the present invention. Hence, it should be understood that the above described cue responsive film stopping device is to be considered as illustrative and not in a limiting sense.

What is claimed is:

1. Apparatus for stopping a moving film in response to a cue patch thereon, said apparatus comprising
   (a) means including a motor for driving said film,
   (b) means for detecting said cue patch,
   (c) means responsive to said detecting means for deenergizing said motor whereby said motor is permitted to coast,
   (d) braking means for said motor, and
   (e) adjustable brake actuating means driven by said motor means while coasting for energizing said braking means.

2. Apparatus for stopping a moving film driven by a feed sprocket mounted on a rotatable shaft in response to a cue patch on said film, comprising
   (a) a motor for rotating said shaft,
   (b) means for detecting said cue patch,
   (c) a pivotally mounted lever,
   (d) a link pivotally connected to said lever and extending in the vicinity of said rotatable shaft,
   (e) means responsive to said detecting means to move said link into contact with said shaft whereby said link is moved substantially axially by said rotating shaft to thereby rotate said lever,
   (f) means responsive to the pivoting of said lever to deenergize said motor, and
   (g) means responsive to further axial movement of said link to brake said motor.

3. Apparatus for stopping a shaft driven by a motor in response to a cue patch on a film, said apparatus having an electromagnetically energizable brake means for said motor, comprising
   (a) a lever pivotally mounted at a point thereon between the ends thereof,
   (b) a switch actuating member extending from said lever adjacent one end thereof,
   (c) a normally open switch held closed by said actuat- member, said switch being connectable in series with a power supply for said motor,
   (d) a link pivotally attached to the lever adjacent the opposite end thereof, said link extending in the vicinity of said shaft,
   (e) a collar adjustably mounted on said link,
   (f) means to move said link into operative contact with said shaft,
   (g) means responsive to said cue patch to energize said link moving means whereby said link is caused to move substantially axially in response to rotation of said shaft and said link moves said lever to the point where motion of said acutating member permits opening of said switch to deenergize said motor means, and
   (h) a second normally open switch connectable in series with said energizing means for said brake and having an operating element mounted adjacent said link and in the path of said collar, said link being moved by contact with said shaft to the point where said collar causes closing of said second mentioned switch to energize said brake means.

4. Apparatus for stopping a shaft driven by a motor in response to a cue patch on a film, said apparatus having an electromagnetically energizable brake means for said motor, comprising
   (a) a lever pivotally mounted at a point thereon between the ends thereof,
   (b) a switch actuating member extending from said lever adjacent one end thereof,
   (c) a normally open switch held closed by said acutating member, said switch being connectable in series with a power supply for said motor,
   (d) a link pivotally attached to the lever adjacent the opposite end thereof, said link extending in the vicinity of said shaft,
   (e) a collar adjustably mounted on said link,
   (f) means to move said link into operative contact with said shaft,
   (g) means responsive to said cue patch to energize said means to move said link laterally whereby said link is caused to move substantially axially in response to rotation of said shaft and said link moves said lever to the point where motion of said actuating member permits opening of said switch to deenergize said motor means,
   (h) a second normally open switch connectable in serries with said energizing means for said brake and having an operating element mounted adjacent said link and in the path of said collar, said link being moved by contact with said shaft to the point where said collar causes closing of said second mentioned switch to energize said brake means,
   (i) means operative after a predetermined delay to deenergize said means to move said rod laterally,
   (j) and gravity operated means coupled to said lever to rotate said lever back to its position of rest.

5. Apparatus for stopping a shaft driven by a motor in response to a cue patch on a film, said apparatus having an electromagnetically energizable brake means for said motor, comprising
   (a) a lever pivotally mounted at a point thereon between the ends thereof,
   (b) a switch actuating member extending from said lever adjacent one end thereof,
   (c) a normally open switch and held closed by said actuating member, said switch being connectable in series with a power supply for said motor,
   (d) a link pivotally attached to the lever adjacent the opposite end thereof, said link extending in the vicinity of said shaft,
   (e) a collar adjustably mounted on said link,
   (f) means to move said link into operative contact with said shaft,
   (g) means responsive to said cue patch to energize said means to move said link laterally whereby said link is caused to move substantially axially in response to rotation of said shaft and said link moves said lever to the point where motion of said actuating member permits opening of said switch to deenergize said motor means,
   (h) a second normally open switch connectable in series with said energizing means for said brake and having an operating element mounted adjacent said link and in the path of said collar, said rod being moved by contact with said shaft to the point where said collar causes closing of said second mentioned switch to energize said brake means, (i) means operative after a predetermined delay to de-energize said means to move said rod laterally, and (j) gravity operated means to rotate said lever back to its position of rest, said brake comprising a friction element of stretchable resilient material.

6. Apparatus for stopping a cued moving film in response to said cue, said apparatus comprising (a) driving means for driving said film,
(b) means for detecting said cue,
(c) means responsive to said detecting means for de-energizing said driving means whereby said driving means is permitted to coast,
(d) braking means for said driving means, and
(e) adjustable brake actuating means driven by said driving means while coasting for energizing said braking means.

References Cited by the Examiner

UNITED STATES PATENTS 2,425,704  8/1947  Nemeth _____ 352—187 X
3,154,233  10/1964  Hubbard _____ 226—9

M. HENSON WOOD, JR., *Primary Examiner.*